June 6, 1950 H. HERMANNY 2,510,109
DRIVE MECHANISM

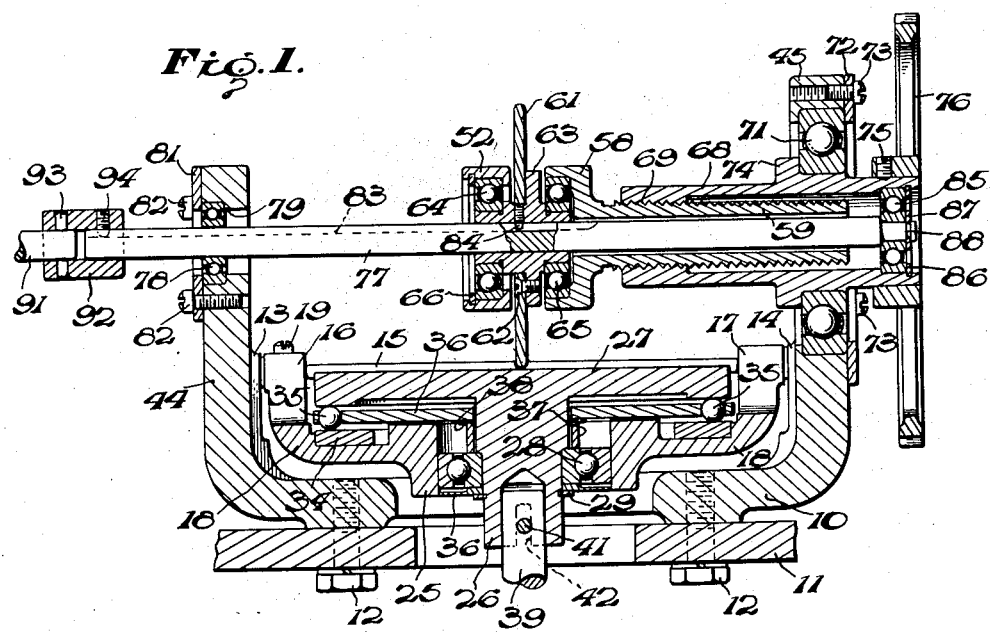

Filed Oct. 1, 1945 2 Sheets-Sheet 2

Inventor
Heinrich Hermanny
By Roy D. Bateman
Attorney

Patented June 6, 1950

2,510,109

UNITED STATES PATENT OFFICE 2,510,109

DRIVE MECHANISM

Heinrich Hermanny, Valley Stream, N. Y., assignor to Bendix Aviation Corporation, Brooklyn, N. Y., a corporation of Delaware Application October 1, 1945, Serial No. 619,705

7 Claims. (Cl. 74—194)

The present invention relates to drive mechanisms, and more particularly to those employing a frictional roller and disc assembly and utilized to provide a variable ratio drive between driving and driven parts of an integrating or like device, although it is not limited to such use.

Although frictional drives of this character have been heretofore proposed, and some of them have gone into fairly wide use, they do not provide all of the operating characteristics desired, particularly when they are subjected to appreciable shocks during operation. Many of them are open to the objection that they embody parts which are thrown out of alignment when subjected to the shocks and stresses of normal operation, and all of them are open to the further objection that they apply traversing forces to the roller in such manner that undue friction is set up, which not only introduces error into the drive but also subjects the parts to a binding action, which in some instances is sufficiently severe to strain or break the parts.

It is accordingly the major object of this invention to provide a novel variable speed friction drive which overcomes all of the disadvantages of the devices of the prior art and which is of rugged yet simple form, is capable of withstanding considerable shocks without damage, and which retains its accuracy throughout its life.

A further important object is to provide a novel variable speed friction drive in which the roller is urged in one traversing direction, against the action of resilient means by an actuator, and the resilient means and the actuator coact with each other and the roller in such manner that there is no tendency for the roller to become misaligned when the roller is undergoing traversing movement in either direction.

A further object is to provide a friction drive device having a novel roller shaft assembly which affords the roller adequate support at all times, embodies an output shaft which is axially restrained against movement, so as to permit power to be delivered without resort to a universal joint or other structure providing end play, and yet the roller may be freely traversed across the face of the disc, so as to vary the speed ratio between its maximum and minimum values.

Another object is to provide a friction disc and roller type of variable ratio drive mechanism with a novel movable mount for the disc, which is rockable about an axis parallel to the roller shaft and which normally lies substantially in the plane of the disc, so as to maintain the roller normal to the disc face at all times and in all shifted positions of the roller with respect to the disc axis.

A further object is to provide, in a variable speed drive of the disc and roller type, a novel unitary carriage assembly for the roller, which affords journalled support for it and at the same time provides for traversing the roller across the face of the disc.

The invention further aims to provide a friction disc and roller drive mechanism embodying novel shafting, bearing, and lubrication features, and other improvements and refinements which will be hereinafter pointed out.

Another object is to provide a friction drive of the disc and roller type with a novel radial and axial load-sustaining bearing assembly and means for assuring proper lubrication thereof at all times.

Further objects will become apparent as the specification proceeds in conjunction with the annexed drawings, and from the appended claims.

In the drawings:

Fig. 1 is a horizontal sectional view through a drive mechanism embodying the invention and is taken substantially on the line 1—1 of Fig. 2.

Fig. 2 is a front elevational view of the mechanism shown in Fig. 1.

Fig. 5 is a fragmental view illustrating the manner in which the ends of the springs are anchored to the standard.

Figure 3:
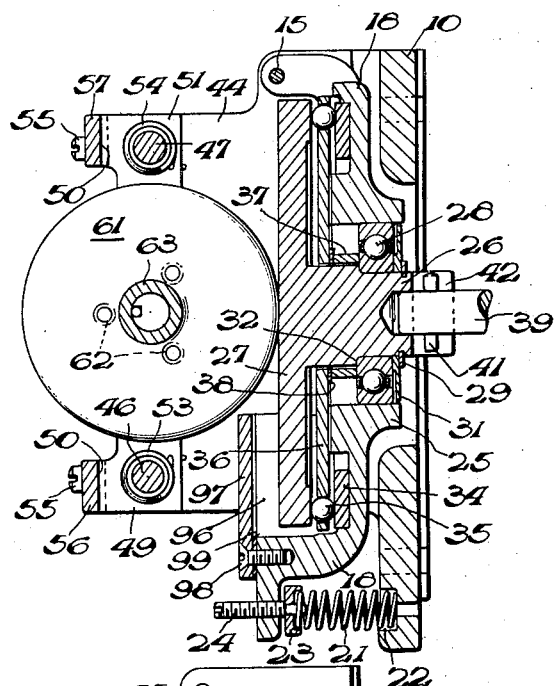
Fig. 3 is a sectional view taken substantially on the line 3—3 of Fig. 2, looking in the direction of the arrows.

With continued reference to the drawings, wherein like reference characters have been employed to designate similar parts throughout the several views thereof, the device comprises a base 10 of suitable form and which is secured to a suitable support 11 by a plurality of cap screws 12. The support is only illustrated in Fig. 1, so as to simplify the disclosure.

Referring more particularly to Figs. 1 and 2, base 10 is provided with a pair of bosses 13 and 14 in which a shaft 15 is mounted for limited rocking movement. The shaft is carried by a pair of ears 16 and 17 of a frame-like support 18, and is locked against endwise movement by set screws 19 or the like. As seen more clearly in Fig. 3, frame 18 is urged in a clockwise direction about its pivot by means of a compression spring 21 which seats in a recess 22 in support 10 and acts against a cupped spring retainer 23 carried on the shank of a set screw 24. The latter is threaded into frame 18 and it is apparent that by rotating the set screw the stress in the spring may be adjustably varied. This is utilized to establish the proper frictional engagement between the disc and roller, in a manner which will be hereinafter pointed out.

Frame 18 is provided with a hub portion 25 in which the shaft portion 26 of a disc 27 is journalled for free rotation by means of a ball bearing 28. The latter is retained against endwise removal from the shaft by a split snap ring 29 seating in a groove in shaft 26, and a grease retainer ring 31.

The inner edge of the inner bearing race bears against a shoulder 32 on the shaft. The outer bearing race is mounted for snug axial sliding movement in hub 25. Cooperating in rolling engagement with a smooth face 33 formed on the rear face of the disc adjacent its periphery, and with a race member 34 seating in a recess in frame 18, are a plurality of ball bearings 35, which are maintained in proper circumferentially spaced relationship by means of a bearing retainer 36. The latter is centered by engaging the outer surface of shaft 26, and axial movement thereof is limited by a collar 37 and a washer 38, the assembly seating against the inner race of bearing 28, as seen in Fig. 3.

Power may be transmitted to disc 27 in any suitable manner. For instance, a constant speed motor driven shaft 39, having a pin 41 seating in a recess 42 in the end of shaft 26, has been found to give good results in practise.

From the structure so far developed it is apparent that radial bearing 28 supports disc 27 for free rotation in frame 18, and that ball bearings 35 are adapted to resist thrusts applied to the face of the disc. Also, the pressure with which spring 21 urges the disc assembly outwardly may be variably adjusted by threading screw 24 in or out with respect to frame structure 18.

Rising from base 10 are two supports or standards 44 and 45, upon which the remaining elements of the structure are mounted. As seen in Figs. 2 and 3, a pair of guide bars or rails 46 and 47 bridge the two standards and are locked in standard 44 as for instance, by means of set screws 48. Mounted for guided sliding movement on guides 46 and 47 are the arms 49 and 51 of a traversing carriage or traveler member 52. A pair of tension springs 53 and 54 are anchored at their ends to standard 45 and the arms of member 52, so as to urge the latter to the right towards the zero driving position shown in Figs. 1 and 2.

As seen in Fig. 2, the left-hand ends of the springs pass through openings in carriage arms 49 and 51 and are turned over to lock them in place. The right-hand ends of the springs, as seen in Fig. 2, are provided with inturned portions which seat in the bottoms of open-ended slots 60 formed in the ends of guide rails 46 and 47.

Secured to the arms of member 52, by means of screws 55, are the arms 56 and 57 of a second carriage member 58, which, as seen in Fig. 1, is provided with an axially extending, externally threaded sleeve portion 59. Arms 56 and 57 are provided with recesses 50 and 60 respectively (Fig. 3), which fit over arms 49 and 51 and accurately locate the two parts of the carriage.

Members 52 and 58 are accordingly rigidly connected together for unitary guided movement along rails 46 and 47 under the influence of springs 53 and 54, and they coact to provide a carrier or carriage having a space between them in which a comparatively thin disc-like roller 61 is journalled. The roller is secured by screws 62 to the flange of a hub member 63, and the latter is provided with oppositely extending sleeve portions which are journalled in ball bearing assemblies 64 and 65. The bearings are carried within members 52 and 58 respectively. The outer race of bearing 64 is restrained against movement out of member 52 by means of split snap-ring 66 whereas the outer race of bearing 65 is press fitted into its seat in member 58.

From the foregoing it is apparent that roller 61 is supported for free rotation in bearings in the carriage assembly, and the latter, by sliding on rails 46 and 47, makes it possible to accurately traverse the roller across the face of disc 27, without relying upon the driven shaft for any substantial degree of support.

It should be particularly observed that guides 46 and 47 are so located as to dispose the axis of rotation of roller 61 along a diameter of disc 27 (Fig. 2); that frame structure 18 carrying disc 27 is mounted for rocking movement about an axis disposed exactly parallel to the axis of roller 61; and that axis of pivot 15 exactly coincides with the plane of the driving face of disc 27. By relating the parts in this manner, spring 21 causes disc 27 to establish a driving pressure between it and roller 61 which is constant, irrespective of the shifted or traversed position of the roller with respect to the disc, and that any minor rocking of frame structure 18 about its pivot 15, in response to wear of the parts, does not result in disposing roller 61 out of its perpendicular relationship to the face of the disc.

The roller is traversed with respect to the face of the disc by means of a sleeve 68, which has an internally threaded portion 69 engaging the threads of sleeve 59, and it is journalled in a large ball bearing 71 located in a seat in standard 45. The ball bearing is of substantial size and is of the combination radial and axial load type, so as to afford adequate support for the sleeve. Its outer race is held in assembled relationship to standard 45 by means of a retainer ring 72 and cap screws 73. Its inner race is press-fitted over the sleeve into engagement with a shoulder 74. Secured on the end of the sleeve, by a set screw 75 or the like, is a gear wheel 76, which may be rotated by a mating gear (not shown) to produce the proper rotation of sleeve 68 to effect the desired roller traverse and resultant speed ratio. If desired, however, any other suitable means may be employed to rotate sleeve 68, it being noted that due to the use of single screw threaded engaging parts it is possible to produce an extremely accurate traversing movement of the roller, inasmuch as sleeve 68 must undergo several complete revolutions to traverse the roller from the zero position of Figs. 1 and 2, into the maximum speed ratio position adjacent the left-hand periphery of the disc, and any back-lash in the parts is effectively eliminated by springs 53 and 54. Referring to Fig. 5, it is observed that retainer plate 72 overlaps the ends of guide rails 46 and 47 and hence restrains them against movement to the right with respect to standard 45.

The resulting power is taken off or delivered by a shaft 77, which is journalled at its left-hand end in a bearing 78 secured in an opening 79 in standard 44, by means of a retainer plate 81 and cap screws 82. Shaft 77 is provided with a longitudinal keyway 83, the walls of which, as seen in Fig. 1, drivingly cooperate with the end of a set screw 84. The screw is threaded into hub 63 and is locked against removal by the roller. The right hand end of shaft 77 is journalled in a bearing 85, whose outer race seats in a recess in sleeve 68 and is locked in place therein by means of a split snap-ring 86. Shaft 77 is restrained against axial movement with respect to the inner race of bearing 85 by means of a split snap-ring, 87, which seats in a groove 88 in the shaft. This effectively restrains the shaft against endwise movement, since bearing 85 is of the "deep race" radial and axial load type.

From the foregoing it is apparent that while roller 61 may derive some degree of support from shaft 77, it is supported primarily by bearings 64 and 65, which in turn are mounted on the carriage and guided for accurate axial movement on the guide rails exactly parallel to shaft 77. There is accordingly no tendency for the shaft to undergo misalignment under the pressure of the disc and spring 21. This feature, in combination with the novel traversing mechanism of the invention, which insures that the traversing and spring force applied to the carriage are exerted exactly parallel to the axis of the roller, and thereby precludes the setting up of binding tendencies, provides a friction drive which overcomes all of the disadvantages of the devices heretofore proposed, in a rugged efficient structure.

The friction drive of the invention also provides the additional advantage of embodying a shaft 77 which does not undergo axial movement in response to traversing of the roller. It is therefore unnecessary to associate with the power delivery end of the device a universal joint or the like providing axial lost-motion. In other words, the power may be taken directly from the left hand end of shaft 77 (Figs. 1 and 2) by a simple coupling or the like such as indicated in Fig. 1 as comprising a shaft 91 having a sleeve 92 secured thereto by a pin 93, and having set screws 94 engaging the keyway of shaft 77.

Figure 4:
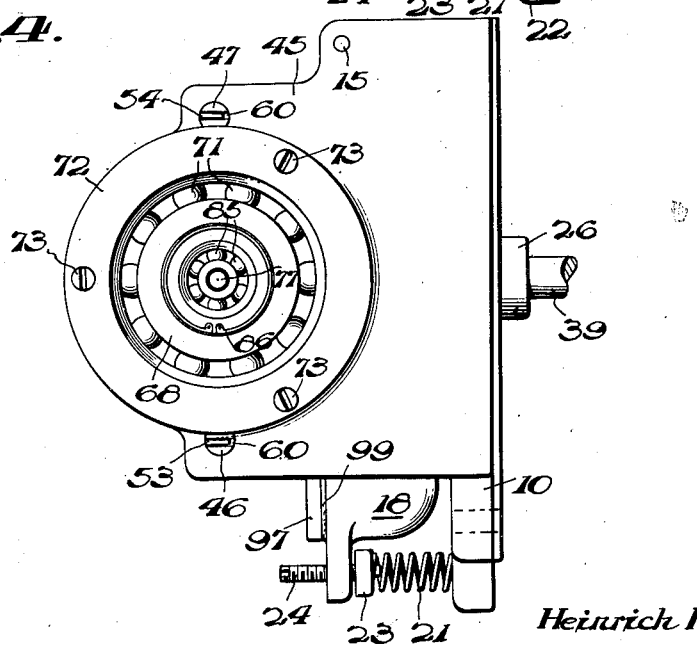
Fig. 4 is an end elevational view of the apparatus of Fig. 2, as it appears when viewed from the right-hand end thereof, and with the gear wheel removed.

The device is normally used in the position illustrated in Figs. 2, 3 and 4, with spring 21 located at the bottom, and in order to provide adequate lubrication of the disc assembly at all times, the structure now to be described is utilized.

The frame structure 18 below the disc axis is provided with a forwardly extending flange 96, to which a chordally-shaped plate 97 is secured by screws 98. A shim-like gasket 99 is clamped between the parts to provide a liquid-tight joint. It is therefore apparent that plate 97 and flange 96 form a reservoir which may be partially filled with lubricant. The periphery of disc 27 and bearings 35 dipping into the lubricant serve to lift it upwardly in the structure where it may flow downwardly into bearing 28. Washer 31 prevents the lubricant around bearing 28 from escaping from the mechanism.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced thereby.

What is claimed is:

1. In a drive mechanism, a drive disc mounted for rotation; a shaft disposed in spaced substantially parallel relationship to the face of said disc and journalled for free rotation; a drive roller mounted for axial sliding movement on said shaft, and having means drivingly coupling it thereto in all its shifted positions; means for yieldingly urging said roller and disc into frictional driving engagement; a rotatable device, operable to apply solely coaxially directed forces upon said drive roller, for shifting the latter along said shaft, to thereby vary the speed ratio between said disc and roller; and spring means constantly acting upon said roller and tending to urge it endwise against the action of said rotatable device, said spring means and said rotatable device acting directly along the axis of said shaft in such manner as to positively preclude any tendency to misalign said roller with respect to said shaft.

2. In a drive mechanism, a support, a disc mounted for rotation on said support; a shaft disposed in spaced substantially parallel relationship to said disc; a roller having a hub; means mounting said roller for axial sliding movement on said shaft, in frictional driving engagement with said disc; means for urging said roller and disc into engagement under a predetermined pressure, said roller mounting means comprising a support structure having an arm disposed either side of said roller; a bearing interposed between each of said arms and the hub of said roller; spring means connected to said support structure and urging the latter along said shaft in one direction; a rotatable device for moving said support structure along said shaft against the action of said spring means, said spring means and said rotatable device coacting with each other and said shaft in such manner as to positively preclude setting up any tendency to misalign said roller or said support structure with respect to said shaft.

3. In a frictional drive, a support; a friction disc mounted for rotation about a fixed axis on said support; a shaft disposed in spaced parallel relationship to said disc; a roller having an elongated hub; means mounting said roller for axial sliding movement on said shaft, in frictional engagement with said disc; means for urging said roller and disc into frictional driving engagement under a predetermined pressure, said roller mounting means comprising means for causing said roller hub to rotate in synchronism with said shaft and yet permitting free axial sliding movement therealong; a carriage; and bearing means supporting said hub upon said carriage; means for resiliently urging said carriage along said shaft in one direction, comprising at least two springs reacting against said support and acting upon said carriage at diametrically opposite points disposed equal distances from the axis of said shaft; and means for moving said carriage and roller along said shaft against the action of said springs.

4. The frictional drive defined in claim 3, wherein said last-named means comprises an axially projecting sleeve provided on said carriage and cooperating with a second sleeve which is mounted for rotation on said support and restrained against endwise movement with respect thereto, one of said sleeves fitting within the other, and means for causing said first sleeve and said carriage to be moved against the action of said springs when said second sleeve is rotated.

5. The frictional drive defined in claim 3, together with guide means on said support paralleling said shaft for supporting and guiding said carriage throughout its range of movement.

6. The frictional drive defined in claim 3, wherein said carriage comprises an arm disposed either side of said roller and joined together exteriorly of the periphery of said roller, and said bearing means comprises an anti-friction bearing located in each of said arms and mounted on projecting end portions of said roller hub either side of said roller.

7. In a frictional drive, a base, a disc mounted for rotation on said base; a pair of standards rising from said base adjacent said disc; a shaft journalled in one of said standards and a sleeve journalled in the other standard, said shaft projecting into said sleeve and having bearing means for journalling it therein, whereby both said shaft and said sleeve are supported for independent rotation and are restrained against endwise movement; a second sleeve concentric with and threadedly engaging said first sleeve, and adapted to undergo travelling movement along said shaft when said first sleeve is rotated; a pair of journal portions connected to said second sleeve for support thereby; a roller supported for rotation on said journal portions and disposed in engagement with said disc; means for urging said disc and roller into frictional engagement; and means for selectively rotating said first sleeve, to thereby traverse said roller across the face of said disc and vary the speed ratio at will.

HEINRICH HERMANNY.

REFERENCES CITED

The following references are of record in the file of this patent:

UNITED STATES PATENTS

| Number | Name | Date |
|---|---|---|
| 578,536 | Auriol | Mar. 9, 1897 |
| 693,290 | Lucas | Feb. 11, 1902 |
| 859,066 | Hummel | July 2, 1907 |
| 2,149,409 | Van Norman et al. | Mar. 7, 1939 |
| 2,357,035 | Treese et al. | Aug. 29, 1944 |